Inventor
ALEXANDER T. SHEPHERD
By
Cameron, Kerkam & Sutton
Attorneys

United States Patent Office 3,154,688
Patented Oct. 27, 1964

3,154,688
DISPLACEMENT MEASURING APPARATUS USING A REFLECTIVE GRATING AND PLURAL PHOTO-CELLS
Alexander Turnbull Shepherd, Edinburgh, Scotland, assignor to Ferranti, Limited, Hollinwood, Lancashire, England, a company of Great Britain and Northern Ireland
Filed Sept. 27, 1961, Ser. No. 141,056
Claims priority, application Great Britain, Oct. 1, 1960, 33,771/60
7 Claims. (Cl. 250—237)

This invention relates to measuring apparatus, hereinafter referred to as being of the type stated, in which the extent and sense of the movement of an object in one or other of two opposite directions with respect to another object, such as a reference structure, is determined from the signals derived from two or more photoelectric transducers responsive to the conditions at a like number of positions, each to each, along a cyclic optical pattern set up together by two closely-parallel optical gratings ruled with straight lines which in one grating are slightly skew with respect to the lines of the other grating, the gratings being arranged to move relative to one another in a direction approximately normal to the direction of the lines in dependence on said movement, and there being provided electrical stages by which the required measurement is derived from the outputs of the transducers.

Figure 1:
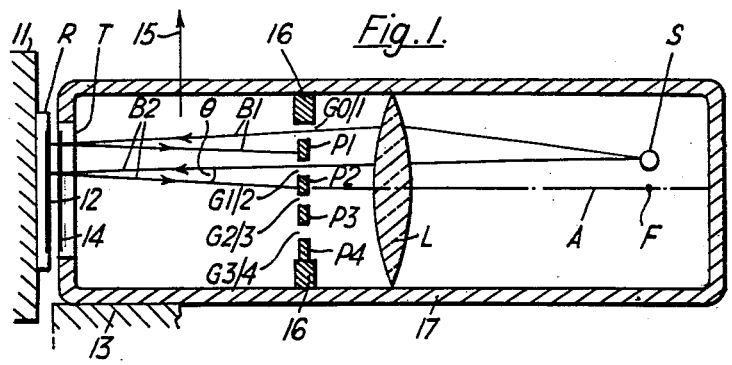
Figure 2:
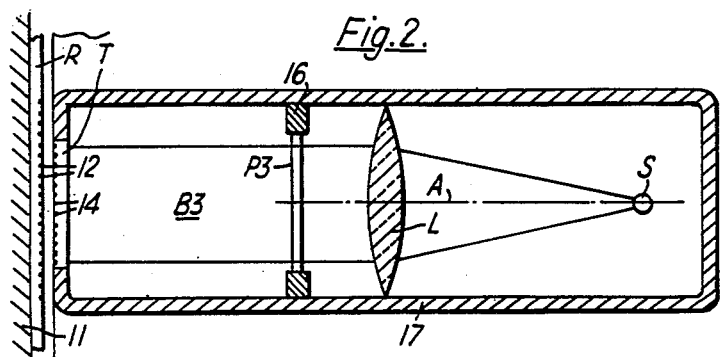

Measuring apparatus of that kind is set forth in U.S. Patent No. 2,886,717 with particular reference to FIGURES 1 and 2 thereof. That patent will hereinafter be referred to as the parent patent, the invention disclosed in it being referred to as the parent invention. Where the movement is straight-line movement the gratings may be flat with the lines of each parallel and coplanar. Where the movement is rotational the gratings may be coaxially cylindrical with the lines of each parallel, as described with reference to FIG. 5 of the parent patent, or the gratings may be in the form of discs or disc segments ruled radially as described with reference to FIGS. 6 and 7 or FIG. 8 of the parent patent.

In the arrangement described with reference to FIG. 11 of the parent patent, where the movement is straight-line movement, the light source which irradiates the two gratings is on the same side of them as the photocells, the grating further from the source being reflective (rather than transparent) so that the light passes from the source to the cells by way of the nearer grating (which is transparent), the further grating, and again the nearer grating.

That arrangement is satisfactory for applications where a high degree of accuracy is not required but where high accuracy is required it is less suitable because of wave pattern distortion arising from the fact that the incident and reflected beams must be oblique so as to prevent the incident beam from being intercepted by the cells, or the reflected beam by the source. In FIG. 11 of the parent patent the obliquity is exaggerated for clarity. In practice the source and the cells may be located closely adjacent so that for the less critical applications the obliquity is tolerable.

For more accurate operation, however, the obliquity in the plane depicted in said FIG. 11—that is, the plane normal to the direction of the lines—produces a form of parallax distortion of the moving pattern due to the fact that the surface containing the lines of one grating is necessarily displaced from the surface containing the lines of the other. This distortion is sufficiently transferred to the photocell signals as to prevent an accurate reading. The signals may also be affected by distortion due to unavoidable variations of the spacing between the ruled surfaces of the respective gratings.

Where four photocells are used, as in the modification of the parent invention disclosed in U.S. Patent No. 2,886,718, corresponding to British patent specification No. 810,478, the cells being aligned in a direction parallel to the pattern, the mean obliquity has to be increased because of the increased space taken by the cells, thereby aggravating the distortion.

An object of the present invention is to provide measuring apparatus of the kind set forth in which one of the gratings in reflective and in which distortion due to the necessary obliquity of the incident and reflected beams is reduced substantially to a minimum.

In accordance with the present invention, measuring apparatus of the type above described, in which one of the gratings is a reflection grating and the other is a transmission grating, includes an optical system for causing each transducer to be irradiated by a beam which, after passing immediately adjacent to that transducer and becoming incident to the reflection grating, is reflected by the reflection grating through the transmisison grating, at the position of the pattern to which that transducer is responsive, the plane defined by each incident and corresponding reflected ray of the beam being approximately parallel to the grating lines and normal to the direction of grating movement.

The term "approximately parallel to the grating lines" means as parallel to said lines as their slight extent of relative skewness permits.

Figure 3:
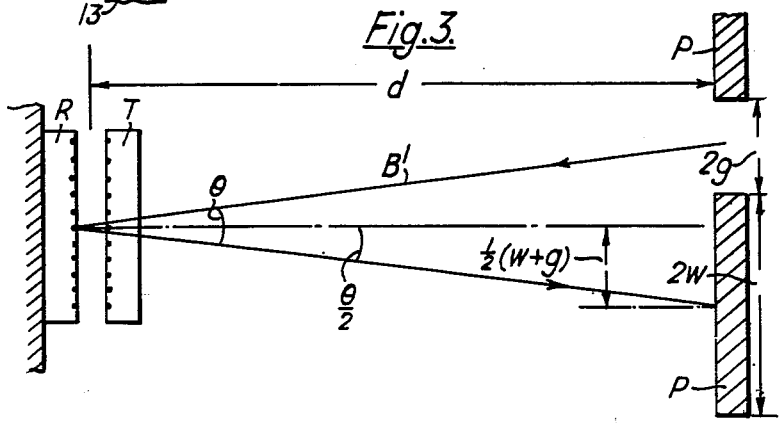

In the accompanying drawings,
FIGURE 1 shows in mid-sectional elevation one embodiment of the invention,
FIGURE 2 is a sectional plan of the embodiment of FIGURE 1 taken on the axis of the lens L, and
FIGURE 3 shows a part of FIGURE 1, with enlarged and relatively exaggerated dimension, to assist the explanation.

The invention will now be described by way of example as applied to a milling tool in order to measure the straight-line movement of the worktable of the tool with respect to the framework of the tool, the table and the framework being respectively the first object and the reference structure above referred to.

In carrying out the invention in accordance with this form, see FIGURES 1 and 2, the measuring apparatus includes an extended length of reflection grating R secured to the table 11 and ruled regularly with straight coplanar parallel lines 12. It is assumed for convenience of description that the table is arranged to move horizontally and that accordingly the lines 12 are vertical. The grating is reflective to light reaching it from the right, as viewed in the drawings.

Closely parallel to grating R and in front of it is a short length of transmission grating T secured to the tool frame 13 and ruled regularly with straight coplanar parallel lines 14 of pitch identical with that of lines 12. The lines 14 are slightly skew with respect to lines 12 so that the two gratings when irradiated set up together a cyclic pattern of alternate opacities and transparencies as described with reference to FIG. 2 of the parent patent. The pattern extends in the direction of the arrow 15 in the present FIG. 1—that is, vertically—and moves in that direction when grating R moves horizontally relative to grating T.

Facing the pattern is a straight array of four photocells P1 to P4 aligned vertically (with cell P1 uppermost) so as to be disposed with respect to the pattern as described with reference to FIG. 1 of the aforesaid Patent No. 2,886,718. The cells are equally spaced apart in the direction of the pattern movement—that is, vertically— with a light-transmitting gap G1/2, G2/3, or G3/4, between adjacent cells P1 and P2, P2 and P3, or P3 and P4, as the case may be. The mounting 16 of the array allows a similar gap G0/1 just above cell P1. A suitable length for these gaps in comparison with the vertical length of each cell and other dimensions will be discussed later. Each cell, which may be of the semiconductor kind, is responsive to light which reaches it only from the direction of the pattern. For deriving the measurement of the worktable movement the cells are connected to electrical stages which are not shown but which may be disclosed in Patent No. 2,886,718.

Behind the array of cells—that is, on the non-responsive side of them remote from the gratings—is a collimating lens L and a point source of light S, in that order. The lens is located with its principal axis A horizontal and aligned on the centre of the array of cells and of the pattern. Source S lies in the focal plane of the lens but is displaced upwards to a small extent from axis A so that the imaginary line joining S to the focal point F of the lens is parallel to lines 12 of grating R.

The cells, the lens, and the light source are enclosed in a casing 17 one end of which includes grating T to act as a transparent window, the casing being otherwise opaque. The connections (not shown) between the cells and the electrical stages are taken through the wall of the casing at some convenient point.

In operation, this displacement of the light source from the lens axis produces a slight inclination to the normal at the grating lines of the axis of the parallel beam of light emerging from the lens which is sufficient to cause each cell to be irradiated by a subsidiary beam, of broad ribbon-like form in plan (see FIG. 2, which shows the beam B3 for cell P3), reflected from grating R through grating T, where the pattern has the condition associated with that cell, after passing as an incident beam immediately adjacent to that cell from the source to the gratings. For example, cell P1 is irradiated by the beam B1 which passes as an incident beam through gap G0/1 just above the cell; cell P2 is irradiated by the beam B2 which as an incident beam passes through gap G1/2 just above cell P2; and so on. Thus each beam except one (that irradiating cell P1) passes as an incident beam between the cell it irradiates and an adjacent cell. The operation of the apparatus as the worktable moves is then as described in Patent No. 2,886,718.

The cells with their light-transmitting spaces thus in effect act as a mask in the path of the collimated beam from the lens, the combination of light source, lens, and mask constituting the optical system, above referred to, for irradiating the pattern.

The accuracy of response is dependent on the smallness of the angle $\theta$ between each incident and corresponding reflected ray of each beam, the accuracy being enhanced by the fact that each incident and corresponding reflected ray lie approximately in the plane of least distortion—that is, the plane which is parallel to the grating lines and normal to the direction of grating movement—a construction which causes errors due to parallax to be reduced to a minimum. To produce such rays the common parallel beam derived from lens L is parallel to those planes whilst being slightly inclined as described.

Where $2g$ is the length of each vertical gap between cells (see FIG. 3), $2w$ is the vertical length, or the overall dimension in the plane of least distortion, of each cell P, and $d$ is the distance of the cells from the mid plane of the gratings, then the angle of obliquity $\theta/2$ of each ray B1 (represented by a side view of a beam) to the normal at the point of intersection at the gratings is approximately equal to $\frac{1}{2}(w+g)/d$, and these quantities should be chosen so as to give that angle, as determined by the inclination of the common beam derived from source S, the minimum value practicable. Owing to the fact that the source necessarily has a finite length, rather than being a point source, it is found in practice that a suitable value for $g$ is $2w/3$. Hence the angle $\theta$ between incident and reflected rays is approximately equal to the angle subtended at the gratings by that overall dimension of a cell which is in the plane of least distortion.

In an alternative embodiment (not shown) the source S lies on the lens axis A which itself is tilted from normality to the gratings to provide the required obliquity.

Instead of using a point source of light, a straight-filament lamp may be used, provided the length of the filament is parallel to the grating lines. Each subsidiary beam of collimated light passing to a cell is now a composite one derived from an infinity of point sources disposed along the line of the filament, but this in practice is found to have no harmful effect, provided that $l/f$ is small compared with $s/d$, where $s$ is the wavelength of the pattern formed by the gratings, $d$ again the distance between gratings and cells, $l$ the filament length, and $f$ the focal length of lens L.

It is emphasised that such terms as "vertical" and "horizontal" applied to the embodiment first described are merely to clarify the description. The apparatus need be no different if the worktable was arranged to move, say, vertically; in which case the lines of the gratings are approximately horizontal and the source is displaced horizontally from the lens axis to suit the now horizontal disposition of the line of photocells.

In arrangements previously disclosed employing four cells, the cells are combined in a mounting which does not allow light-transmitting gaps between adjacent cells. Where, therefore, such an array is used with a reflection grating the beam to one at least of the two end cells can pass as an incident ray no nearer than just beyond the other end cell, which results in the angle $\theta$ having a comparatively large value—that of approximately the angle subtended at the gratings by the overall dimension in the plane of least distortion of the array of four cells, rather than the much smaller angle equal approximately to that subtended at the gratings by the corresponding dimension of one cell only, as with the arrangements of the present invention.

Where there are two cells rather than four, the apparatus being similar to that disclosed in the parent Patent No. 2,886,717, the incident beam for one of the cells passes through a space between the two of them whilst the incident beam for the other cell passes just outside it, as in the case of cell P1 of the embodiment first described.

In another embodiment the grating which forms part of the casing 17 is the reflection grating, which is here of short length. The transmission grating is of extended length and secured to the worktable, slots being cut in the casing 17 to allow this grating to pass freely through the casing in front of the reflection grating and move relative to it as before.

The present invention is also applicable where the worktable movement is rotational and the gratings are either coaxially cylindrical or ruled radially, as described above. In either case the plane of least distortion in which each pair of incident and reflected beams lie is approximately parallel to the lines, this plane being normal to the direction of grating movement and hence including the cylindrical axis or disc centres, as the case may be.

What I claim is:

1. Measuring apparatus for determining the extent and sense of the movement of one object in one or other of two opposite directions with respect to another object including (a) two closely-parallel optical gratings ruled with straight lines which is one grating are slightly skew with respect to the lines of the other grating so as to set up a cyclic optical pattern in the direction of the lines, one of said gratings being a reflection grating and the other being a transmission grating, said gratings being arranged to move relative to one another in a direction approximately normal to the direction of the lines in dependence on said movement of the one object with respect to the other, (b) at least two photo-electric transducers spaced apart in the direction of the pattern, (c) an optical system for irradiating each transducer by a light beam which is reflected by the reflection grating through the transmission grating at the position of the pattern to which that transducer is responsive, said optical system including means for so projecting each beam incident to the reflection grating that it passes immediately adjacent the transducer which it irradiates and is reflected to that transducer by the reflection grating through the transmission grating, each of the planes defined by an incident and a corresponding reflected ray of the beam being approximately parallel to the grating lines and normal to the direction of grating movement, each incident beam except one passing between the transducer it irradiates and an adjacent transducer, and (d) electrical stages for deriving from said transducers output signals indicative of said movement of the one object with respect to the other object.

2. Apparatus as claimed in claim 1 wherein the angle between each of said incident and corresponding reflected rays is approximately equal to the angle subtended at the gratings by the overall dimension in said plane of each transducer.

3. Apparatus as claimed in claim 1 wherein the beam projecting means is so constructed and arranged as to project a common parallel beam towards the gratings from the side of the transducers remote from the gratings, the axis of said beam being slightly inclined with respect to the normal at the grating lines.

4. Apparatus as claimed in claim 1 including a casing enclosing the optical system which is opaque except for a window constituted by the transmission grating.

5. Measuring apparatus for determining the extent and sense of the movement of one object in one or other of two opposite directions with respect to another object including (a) two closely-parallel optical gratings ruled with straight lines which in one grating are slightly skew with respect to the lines of the other grating so as to set up a cyclic optical pattern in the direction of the lines, one of said gratings being a reflection grating and the other being a transmission grating, said gratings being arranged to move relative to one another in a direction approximately normal to the direction of the lines in dependence on said movement of the one object with respect to the other, (b) an array of at least two photo-electric transducers arranged in a line substantially parallel to the direction of the pattern and spaced apart to provide light transmitting gaps therebetween, each transducer being responsive to light which reaches it only from the direction of the gratings, (c) an optical system for irradiating each transducer by a light beam which is reflected by the reflection grating through the transmission grating at the position of the pattern to which that transducer is responsive, said optical system including a source of light positioned on the non-responsive side of the transducers remote from the gratings and means for so projecting each beam incident to the reflection grating, except one, that it passes through one of said light transmitting gaps immediately adjacent the transducer which it irradiates and is reflected to that transducer by the reflection grating through the transmission grating, the one beam passing immediately adjacent a transducer at one end of the array on the side of said transducer remote from the adjacent transducer, each of the planes defined by an incident and a corresponding reflected ray of the beam being approximately parallel to the grating lines and normal to the direction of grating movement, and (d) electrical stages for deriving from said transducers output signals indicative of said movement of the one object with respect to the other object.

6. Measuring apparatus for determining the extent and sense of the movement of one object in one or other of two opposite directions with respect to another object including (a) two closely-parallel optical gratings ruled with straight lines which in one grating are slightly skew with respect to the lines of the other grating so as to set up a cyclic optical pattern in the direction of the lines, one of said gratings being a reflection grating and the other being a transmission grating, said gratings being arranged to move relative to one another in a direction approximately normal to the direction of the lines in dependence on said movement of the one object with respect to the other, (b) an array of at least two photo-electric transducers arranged in a line substantially parallel to the direction of the pattern and spaced apart to provide light transmitting gaps therebetween, each transducer being responsive to light which reaches it only from the direction of the gratings, (c) an optical system for irradiating each transducer by a light beam which is reflected by the reflection grating through the transmission grating at the position of the pattern to which that transducer is responsive, said optical system including a collimating lens and a source of light positioned on the non-responsive side of the transducers remote from the gratings with the lens between said transducers and the light source, the lens having its principal axis perpendicular to the line of the transducer array and substantially collinear with the centres of said array and of the pattern, the light source lying in the focal plane of the lens but being offset slightly from the principal axis thereof, whereby each beam of light incident to the reflection grating except one passes through the light transmitting gap between the transducer it irradiates and an adjacent transducer, the one beam passing immediately adjacent a transducer at one end of the array, and (d) electrical stages for deriving from said transducers output signals indicative of said movement of the one object with respect to the other object.

7. Measuring apparatus for determining the extent and sense of the movement of one object in one or other of two opposite directions with respect to another object including (a) two closely-parallel optical gratings ruled with straight lines which in one grating are slightly skew with respect to the lines of the other grating so as to set up a cyclic optical pattern in the direction of the lines, one of said gratings being a reflection grating and the other being a transmission grating, said gratings being arranged to move relative to one another in a direction approximately normal to the direction of the lines in dependence on said movement of the one object with respect to the other, (b) an array of at least two photo-electric transducers arranged in a line substantially parallel to the direction of the pattern and spaced apart to provide light transmitting gaps therebetween, each transducer being responsive to light which reaches it only from the direction of the gratings, (c) an optical system for irradiating each transducer by a light beam which is reflected by the reflection grating through the transmission grating at the position of the pattern to which that transducer is responsive, said optical system including a source of light so positioned on the non-responsive side of the transducers remote from the gratings that each beam of light incident to the reflection grating passes from the light source immediately adjacent one of the transducers and is reflected to that transducer by the reflection grating through the transmission grating, each of the planes defined by an incident and a corresponding reflected ray of the beam being approximately parallel to the grating lines and normal to the direction of grating movement, each incident beam except one passing through the light transmitting gap between the transducer it irradiates and an adjacent transducer, the one beam passing immediately adjacent a transducer at one end of the array on the side thereof remote from the adjacent transducer, and (d) electrical stages for deriving from said transducers output signals indicative of said movement of the one object with respect to the other object.

References Cited by the Examiner
UNITED STATES PATENTS

| | | | |
|---|---|---|---|
| 2,406,299 | 8/46 | Konlicovitch | 250—237 |
| 2,886,717 | 5/59 | Williamson et al. | 250—220 |

RALPH G. NILSON, *Primary Examiner.*

WALTER STOLWEIN, *Examiner.*